United States Patent
Maguire

(10) Patent No.: US 7,611,384 B2
(45) Date of Patent: Nov. 3, 2009

(54) BATTERY TERMINAL CONNECTOR

(75) Inventor: Pax Maguire, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 11/696,318

(22) Filed: Apr. 4, 2007

(65) Prior Publication Data

US 2008/0248378 A1    Oct. 9, 2008

(51) Int. Cl.
*H01R 4/02* (2006.01)

(52) U.S. Cl. .................................. 439/627; 439/876

(58) Field of Classification Search ............... 439/876, 439/877, 627, 160, 158
See application file for complete search history.

(56) References Cited

U.S. PATENT DOCUMENTS

| | | | |
|---|---|---|---|
| 3,980,388 A * | 9/1976 | Nailor, III | 439/752 |
| 4,581,306 A | 4/1986 | Hasenauer et al. | |
| 5,441,829 A | 8/1995 | Attwood et al. | |
| 5,527,637 A | 6/1996 | Nakazawa et al. | |
| 5,578,392 A | 11/1996 | Kawamura | |
| 6,174,618 B1 * | 1/2001 | Nishiyama et al. | 429/99 |
| 6,442,832 B1 | 9/2002 | Noble | |

* cited by examiner

*Primary Examiner*—T C Patel
*Assistant Examiner*—Harshad C Patel
(74) *Attorney, Agent, or Firm*—David Kelley, Esq.; Tung & Associates

(57) ABSTRACT

A terminal connector includes a pair of spaced-apart connector units each having a connector plate, a pair of clamp arms extending from the connector plate, a clamp carried by the pair of clamp arms and a connecting cable attached to the clamp of each of the pair of connector units. A battery module and a battery system are also disclosed.

18 Claims, 5 Drawing Sheets

BATTERY TERMINAL CONNECTOR

FIELD

The present invention relates to devices for connecting battery terminals. More particularly, the present invention relates to a battery terminal connector which is simple in design and facilitates quick, reliable connections between battery terminals.

BACKGROUND

In many applications, it is necessary to use high-voltage battery systems as a mobile source of electrical power. It is desirable for high-voltage battery systems to have bus-bars that can be readily removed and reinstalled to facilitate a high degree of serviceability. However, many conventional high-voltage battery systems having a high degree of serviceability are relatively expensive and consume more volume than is the case with systems having permanent connections due to the typically large number of parts, high degree of manual labor involved in removal and installation and use of threaded fasteners with torque prevailing features in the highly-serviceable systems.

SUMMARY

The present invention is generally directed to a terminal connector. An illustrative embodiment of the terminal connector includes a pair of spaced-apart connector units each having a connector plate, a pair of clamp arms extending from the connector plate, a clamp carried by the pair of clamp arms and a connecting cable attached to the clamp of each of the pair of connector units. The invention is also directed to a battery module and a battery system.

BRIEF DESCRIPTION OF THE DRAWINGS

The invention will now be described, by way of example, with reference to the accompanying drawings, in which.

DETAILED DESCRIPTION

Figure 3:
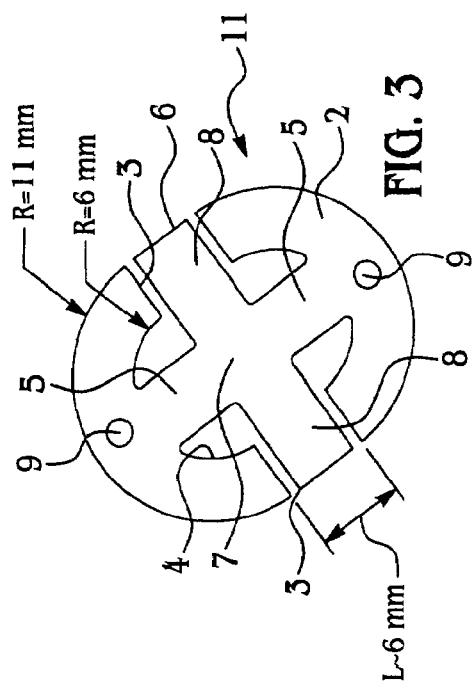
FIG. 3 is a top view of a sheet metal blank for making a connector unit element of an illustrative embodiment of the terminal connector, with a clamp element of the connector unit shown in an uncrimped configuration, more particularly illustrating illustrative dimensions of various features of the connector unit.
Figure 2:
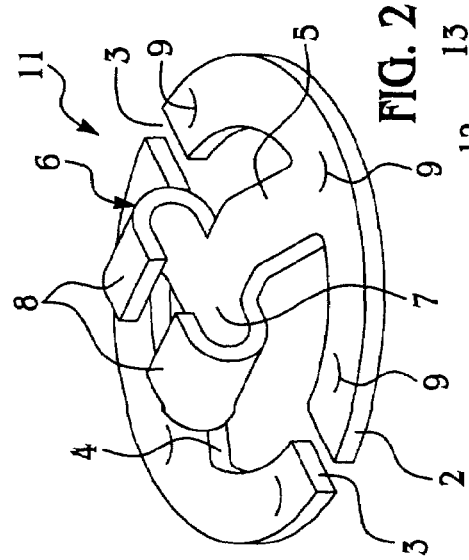
FIG. 2 is a perspective view of a connector unit element of an illustrative embodiment of the terminal connector, with a clamp element of the connector unit shown in a crimped configuration.
Figure 4:
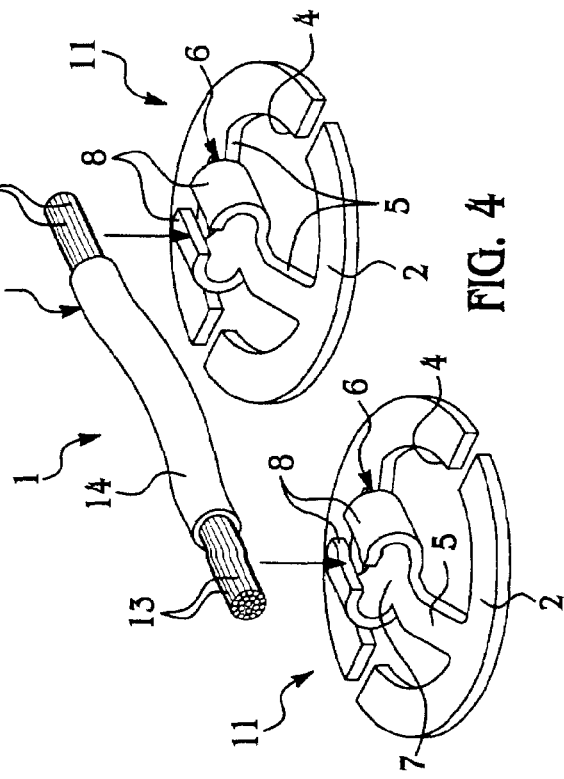
FIG. 4 is an exploded, perspective view of an illustrative embodiment of the terminal connector.

Referring initially to FIGS. 2-4 of the drawings, an illustrative embodiment of the terminal connector is generally indicated by reference numeral 1 in FIG. 4. The terminal connector 1 includes a pair of connector units 11 which are disposed in electrical contact with positive and negative terminals (not shown) of a pair of respective batteries which are to be connected using the terminal connector 1, as will be hereinafter described. Each connector unit 11 is a bendable, electrically-conductive material such as stamped sheet metal, for example, and includes a connector plate 2. A plate opening 4 extends through the connector plate 2. As shown in FIGS. 2 and 3, in some embodiments a pair of spaced-apart plate slots 3 separates the connector plate 2 into semicircular halves of substantially equal size. As shown in FIG. 4, in other embodiments the plate slots 3 are omitted. As shown in FIGS. 2 and 3, multiple projection weld dimples 9 may be provided in the connector plate 2 in spaced-apart relationship with respect to each other.

A pair of clamp arms 5 extends inwardly from opposite portions or segments of the connector plate 2, toward each other and over the plate opening 4. Each of the clamp arms 5 is disposed at an angle with respect to the plane of the connector plate 2. A clamp 6 is provided between the clamp arms 5. The clamp 6 typically includes a clamp base 7 which may be continuous with the clamp arms 5. A pair of bendable crimp arms 8 extends from the clamp base 7. The crimp arms 8 are normally disposed in the extended, un-crimped configuration shown in FIG. 3. The crimp arms 8 can be selectively bended to the crimped configuration shown in FIG. 2. Typical dimensions for the various features of each connector unit 11 are shown in FIG. 3.

A connecting conductor 12 connects the connector units 11 to each other in the terminal connector 1. The connecting conductor 12 includes multiple wire strands 13, which may also be a single conductive wire or a rigid bus bar. Optionally, wire insulation 14 covers the middle portion of the wire strands 13, leaving the wire strands 13 exposed at the respective ends of the connecting cable 12. Accordingly, in use of the terminal connector 1, the clamp 6 of each connector unit 11 is bended or crimped around the wire strands 13 at each corresponding end of the connecting cable 12 to electrically connect the connector units 11 to each other.

Figure 1:
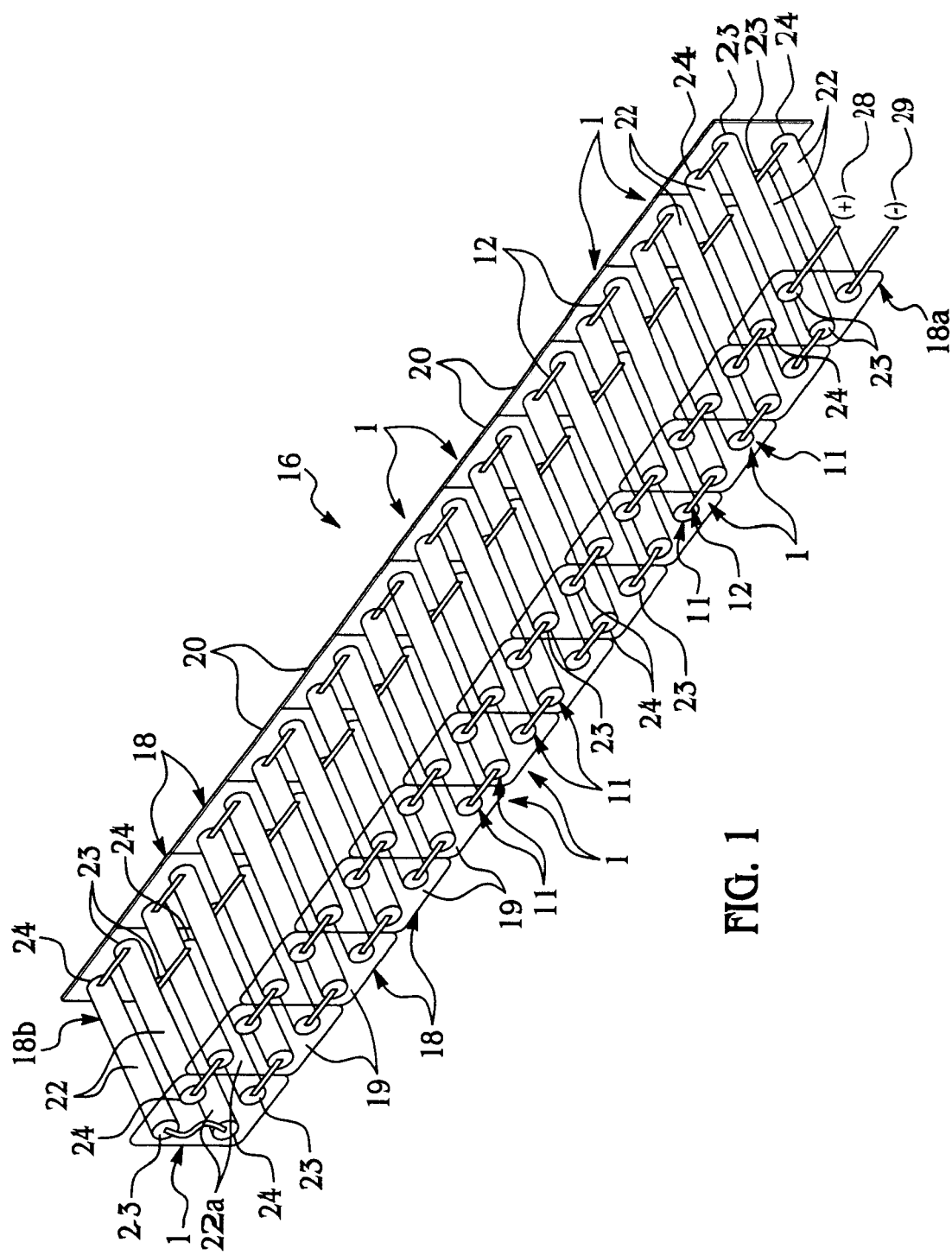
FIG. 1 is a perspective, partially schematic view of a battery system having multiple adjacent battery modules, with multiple terminal connectors connecting terminals of adjacent batteries in the battery modules according to one exemplary connection array.

Referring next to FIGS. 1, 5-7, 11 and 12 of the drawings, a battery system 16 which utilizes multiple terminal connectors 1 is shown in FIG. 1. The battery system 16 includes multiple, adjacent battery modules 18, with terminal battery module 18a provided at one end of the battery system 16. Each battery module 18 includes a first module end plate 19 and a second module end plate 20 which are spaced-apart with respect to each other. A pair of upper batteries 22 and a pair of lower batteries 22a, each having a negative terminal 23 and a positive terminal 24, extends between the first module end plate 19 and the second module end plate 20. In each battery module 18, the polarities of the upper batteries 22 are oriented opposite each other, as are the polarities of the lower batteries 22a.

Figure 5:
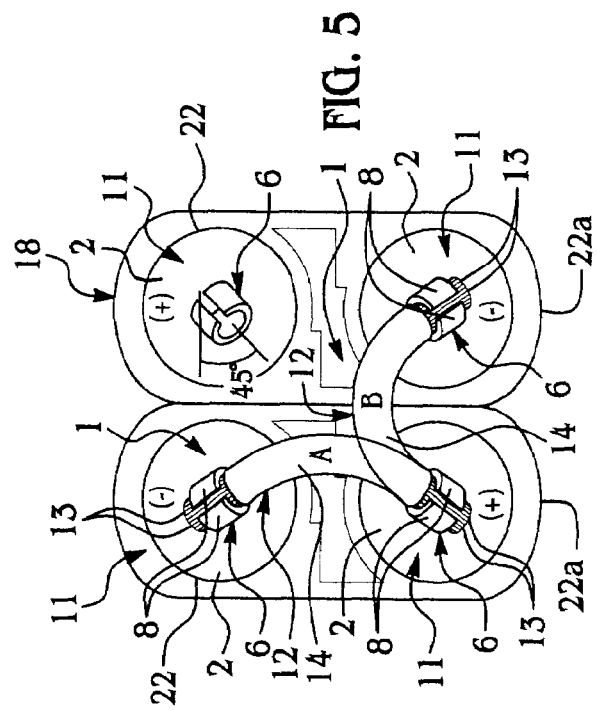
FIG. 5 is a partially schematic end view of a battery module element of a battery system, illustrating alternative connection configurations of a terminal connector.

Multiple terminal connectors 1 are used to electrically connect the upper batteries 22 and the lower batteries 22a of the battery modules 18 to each other in the battery system 16. As shown in 6, 7, 11 and 12, connector units 11 are attached to the first module end plate 19 and the second module end plate 20 in electrically-conductive contact with the respective positive terminals 24 and the negative terminals 23 of the upper batteries 22 and lower batteries 22a. Each connector unit 11 can be attached to the first module end plate 19 or second module end plate 20 using any suitable technique which is known by those skilled in the art. For example, in some embodiments, the connector plate 2 of each connector unit 11 is welded to the first module end plate 19 or second module end plate 20 at the projection weld dimples 9 (FIGS. 2 and 3) of each connector plate 2. As shown in FIG. 5, the connector plate 2 of each connector unit 11 is attached to the first module end plate 19 or second module end plate 20 in such a manner that the clamp 6 of each connector unit 11 is disposed at a generally 45 degree angle with respect to the face of each battery module 18. Therefore, the clamps 6 of the respective connector units 11 of each terminal connector 1 are disposed at a generally perpendicular or 90-degree angle with respect to each other.

A connector cable 12 is used to electrically connect the positive terminal 24 of one upper battery 22 or lower battery 22a to the negative terminal 23 of another upper battery 22 or lower battery 22a, through the connector units 11 which are disposed in electrically-conductive contact with each. Accordingly, as shown in FIG. 5, the exposed wire strands 13 at each end of each connector cable 12 are initially placed against the clamp base 7 of the clamp 6 on the corresponding connector unit 11, after which the crimp arms 8 are crimped around the wire strands 13, to attach or fasten each connector cable 12 to the respective connector units 11 of each terminal connector 1.

Figure 6:
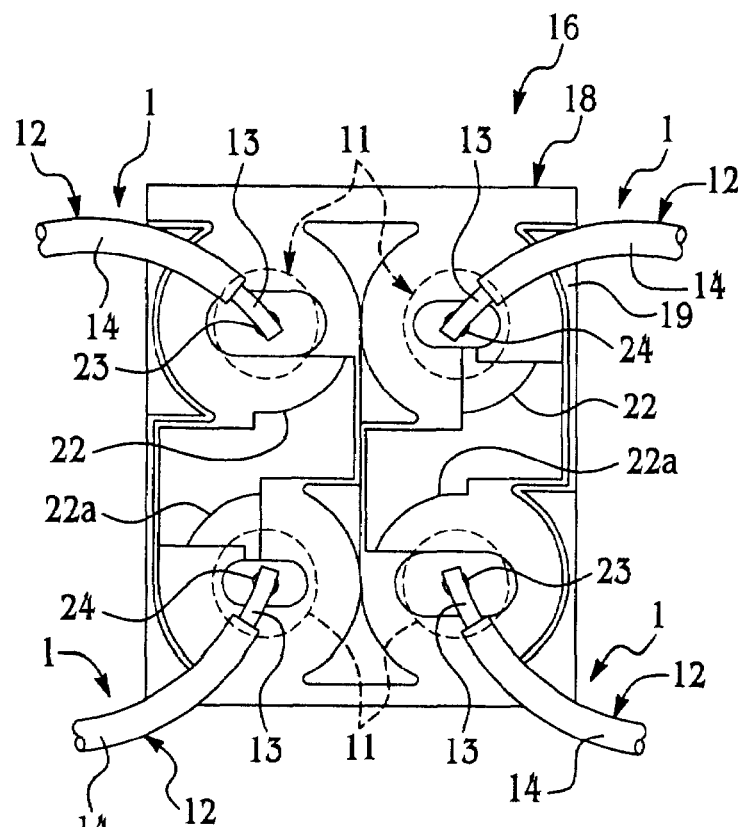
FIG. 6 is a first end view of a battery module element of the battery system shown in FIG. 1, more particularly illustrating a connection configuration of terminal connectors at a first end of each battery module.
Figure 7:
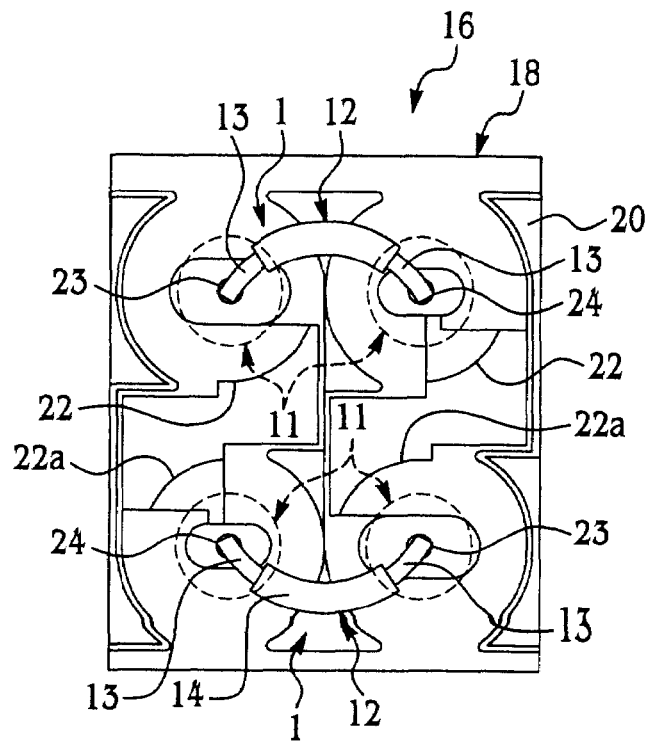
FIG. 7 is a second end view of a battery module element of the battery system shown in FIG. 1, more particularly illustrating a connection configuration of terminal connectors at a second end of each battery module.
Figure 11:
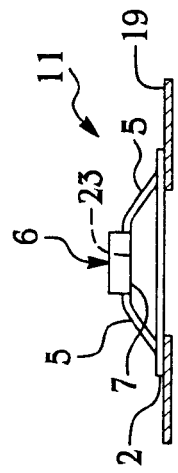
FIG. 11 is a side view of a connector unit element of an illustrative embodiment of the terminal connector, with a positive terminal of a battery (shown in phantom) disposed in electrical contact with the connector unit.
Figure 12:
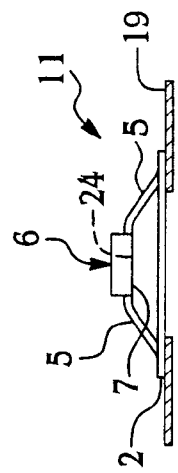
FIG. 12 is a side view of a connector unit element of an illustrative embodiment of the terminal connector, with a negative terminal of a battery (shown in phantom) disposed in electrical contact with the connector unit.

As shown in FIGS. 1 and 6, the upper batteries 22 and the lower batteries 22a are electrically connected to each other in series in the battery system 16 typically as follows. At the first module end plate 19 of each battery module 18, the positive terminal 24 of one upper battery 22 is connected to the negative terminal 23 of an upper battery 22 of the adjacent battery module 18. In like manner, at the first module end plate 19 of each battery module 18, the negative terminal 23 of one lower battery 22a is connected to the positive terminal 24 of a lower battery 22a of the adjacent battery module 18. As shown in FIGS. 1 and 7, at the second module end plate 20 of each battery module 18, the positive terminal 24 of one upper battery 22 is connected to the negative terminal 23 of the adjacent upper battery 22 in the same battery module 18. In like manner, the negative terminal 23 of one lower battery 22a is connected to the positive terminal 24 of the adjacent lower battery 22a in the same battery module 18.

As shown in FIG. 1, at the terminal battery module 18b, a terminal connector 1 connects the positive terminal 24 of an upper battery 22 to the negative terminal 23 of a lower battery 22a. Therefore, the upper batteries 22 and the lower batteries 22a of the battery modules 18 are electrically connected to each other in series. At the terminal battery module 18a, a positive terminal lead 28 and a negative terminal lead 29 are connected to the negative terminal 24 of an upper battery 22 and the positive terminal 24 of a lower battery 22a, respectively. Accordingly, the positive terminal lead 28 and the negative terminal lead 29 are adapted for connection to the positive and negative terminals (not shown), respectively, of an electrical device (not shown) which is to be powered using the battery system 16.

Figure 8:
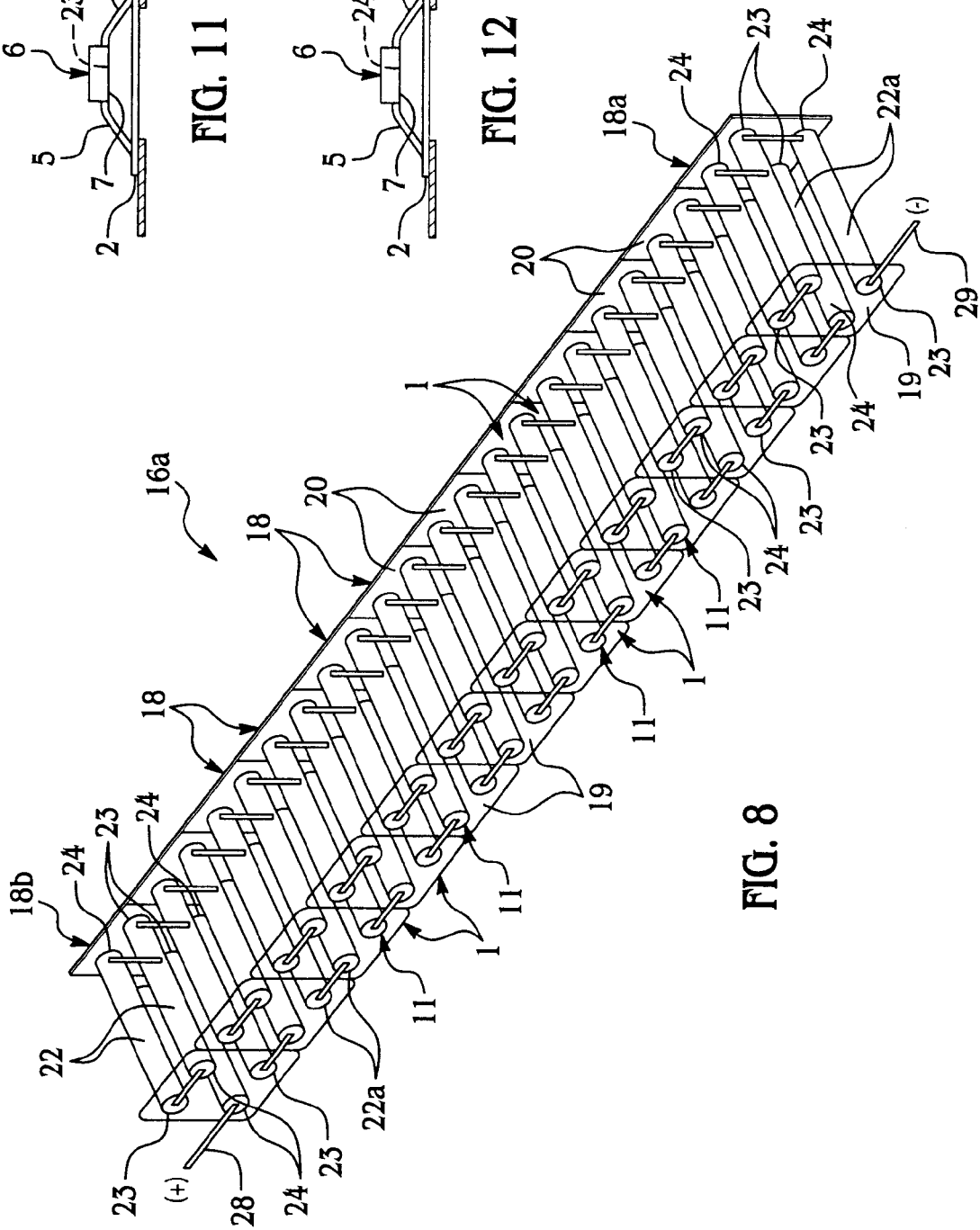
FIG. 8 is a perspective, partially schematic view of a battery system having multiple adjacent battery modules, with multiple terminal connectors connecting terminals of adjacent batteries in the battery modules according to an exemplary connection array which is an alternative to that shown in FIG. 1.
Figure 9:
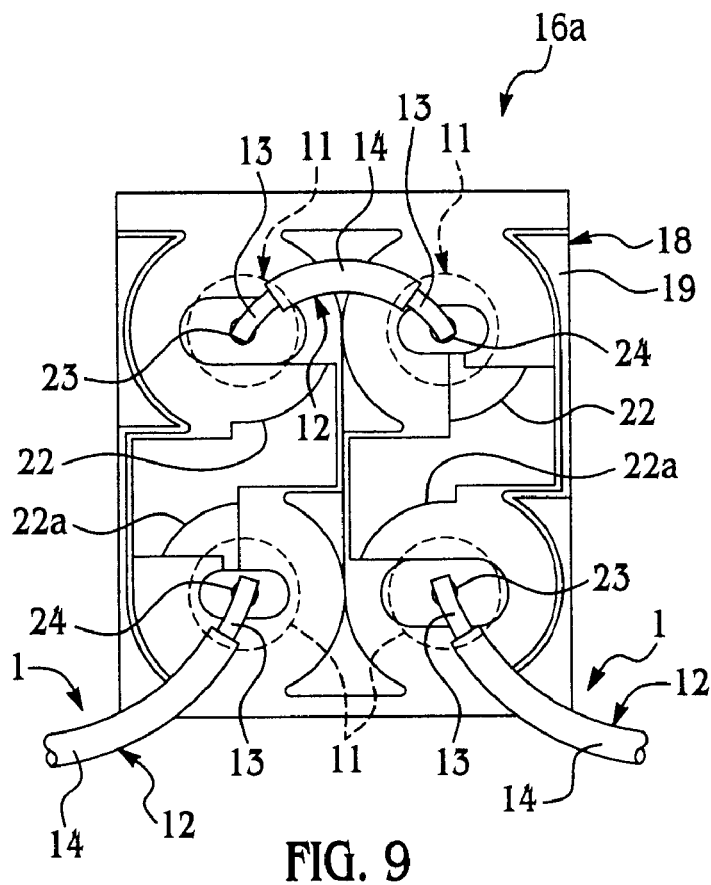
FIG. 9 is a first end view of a battery module element of the battery system shown in FIG. 8, more particularly illustrating a connection configuration of terminal connectors at a first end of each battery module.
Figure 10:
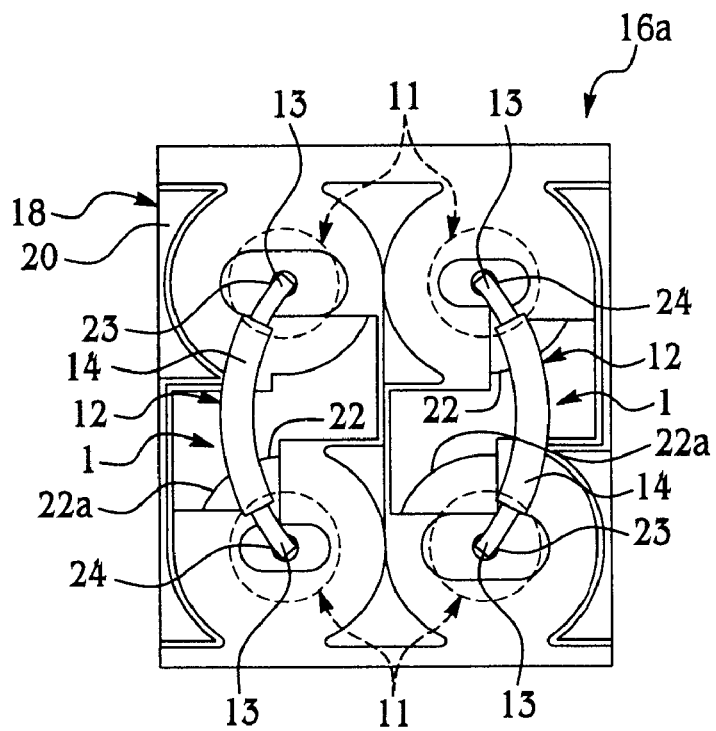
FIG. 10 is a second end view of a battery module element of the battery system shown in FIG. 8, more particularly illustrating a connection configuration of terminal connectors at a second end of each battery module.

Referring next to FIGS. 8-10 of the drawings, an alternative battery system 16a which utilizes multiple terminal connectors 1 is shown in FIG. 8. In the battery system 16a, at the first module end plate 19 of each battery module 18, a terminal connector 1 connects the positive terminal 24 of one upper battery 22 to the negative terminal 23 of the adjacent upper battery 22 in the same battery module 18. A terminal connector 1 connects the positive terminal 24 of one lower battery 22a in each battery module 18 with the negative terminal 23 of a lower battery 22a in the adjacent battery module 18. At the second module end plate 20 of each battery module 18, a first terminal connector 1 connects the positive terminal 24 of one upper battery 22 to the negative terminal 23 of one lower battery 22a. A second terminal connector 1 connects the negative terminal 23 of the other upper battery 22 to the positive terminal 24 of the other lower battery 22a. Therefore, the terminal connectors 1 electrically connect the upper batteries 22 and the lower batteries 22a of the battery modules 18 to each other in series.

At the terminal battery module 18a, a negative terminal lead 29 is connected to the positive terminal 24 of a lower battery 22a. At the terminal battery module 18b, a positive terminal lead 28 is connected to the negative terminal 23 of a lower battery 22a. Accordingly, the positive terminal lead 28 and the negative terminal lead 29 are adapted for connection to the positive and negative terminals (not shown), respectively, of an electrical device (not shown) which is to be powered using the battery system 16.

Referring again to FIG. 5 of the drawings, under some circumstances it may be necessary to rearrange the terminal connection array or configuration of the battery system 16 or 16a. For example, in the orientation labeled "A" in FIG. 5, the connecting cable 12 connects the positive terminal 23 of an upper battery 22 to the negative terminal 23 of a lower battery 22a in the battery module 18. The connecting cable 12 can be detached, even though not reusable, from the positive terminal 24 of the upper battery 22 by uncrimping the crimp arms 8 on the clamp 6 of the connector unit 11 which is attached to the positive terminal 24 of the upper battery 22. The connecting cable 12 can then be readily attached to the positive terminal 24 of the adjacent lower battery 22a by crimping the crimp arms 8 of the clamp 6 of the connector unit 11 which is attached to the positive terminal 24 of the lower battery 22a around the exposed wire strands 13 (FIG. 4) of the connecting cable 12. The same procedure can be repeated to reconfigure the wiring arrangement or array for the adjacent positive terminals 24 and negative terminals 23 on the upper batteries 22 and lower batteries 22a of the battery system 16 or 16a.

While the preferred embodiments of the invention have been described above, it will be recognized and understood that various modifications can be made in the invention and the appended claims are intended to cover all such modifications which may fall within the spirit and scope of the invention.

What is claimed is:

1. A terminal connector, comprising:
   a pair of spaced-apart connector units each having a connector plate, at least one pair of clamp arms extending from said connector plate and a clamp carried by said pair of clamp arms; and
   a connecting conductor attached to said clamp of each of said pair of connector units;
   wherein said clamp comprises a clamp base extending between said pair of clamp arms and a pair of crimp arms extending from said clamp base.

2. The terminal connector of claim 1 further comprising a plate opening extending through said connector plate.

3. The terminal connector of claim 2 further comprising at least one plate slot provided in said connector plate and communicating with said plate opening.

4. The terminal connector of claim 1 further comprising a plurality of projection weld dimples provided in said connector plate.

5. The terminal connector of claim 1 wherein each of said pair of clamp arms is disposed at an angle with respect to a plane of said connector plate.

6. The terminal connector of claim 1 wherein said connecting cable comprises a plurality of wire strands and wire insulation provided on said plurality of wire strands.

7. The terminal connector of claim 1 wherein said connecting conductor is selected from the group consisting of a cable, a wire and a bus bar.

8. The terminal connector of claim 1 wherein said pair of crimp arms of said clamp of a first one of said connector units is disposed at a generally 90-degree angle with respect to said pair of crimp arms of said clamp of a second one of said connector units.

9. A battery module, comprising:
   a pair of first and second module end plates disposed in spaced-apart relationship with respect to each other;
   at least two batteries each having a positive polarity and a negative polarity extending between said pair of first and second module end plates;
   at least one terminal connector attached to at least one of said positive polarity of a first one of said at least two batteries and said negative polarity of a second one of said at least two batteries; and
   wherein said at least one terminal connector comprises a pair of spaced-apart connector units disposed in electrically-conductive contact with at least one of said positive polarity and said negative polarity and each having a connector plate, a pair of clamp arms extending inwardly from said connector plate and a clamp carried by said pair of clamp arms and a connecting cable detachably attached to said clamp of each of said pair of connector units, said clamp comprises a clamp base extending between said pair of clamp arms and a pair of crimp arms extending from said clamp base.

10. The battery module of claim 9 wherein said at least two batteries comprises a first pair of adjacent batteries and a second pair of adjacent batteries adjacent to said first pair of adjacent batteries.

11. The battery module of claim 9 wherein said positive polarity and said negative polarity of said first pair of adjacent batteries are oriented opposite each other and said positive polarity and said negative polarity of said second pair of adjacent batteries are oriented opposite each other.

12. The battery module of claim 9 further comprising a plate opening extending through said connector plate.

13. The battery module of claim 9 wherein said pair of crimp arms of said clamp of a first one of said connector units is disposed at a generally 90-degree angle with respect to said pair of crimp arms of said clamp of a second one of said connector units.

14. The battery module of claim 9 wherein said each of said pair of clamp arms is disposed at an angle with respect to a plane of said connector plate.

15. The battery module of claim 9 wherein said connecting cable comprises a plurality of wire strands and wire insulation provided on said wire strands.

16. A battery system, comprising:
   a plurality of adjacent module units each comprising a pair of first and second module end plates disposed in spaced-apart relationship with respect to each other and a first pair of adjacent batteries each having a positive polarity and a negative polarity extending between said pair of first and second module end plates and a second pair of adjacent batteries each having a positive polarity and a negative polarity extending between said pair of first and second module end plates;
   a plurality of terminal connectors connecting said positive polarity of a first one of said batteries and said negative polarity of a second one of said batteries; and
   wherein said plurality of terminal connectors each comprises a pair of spaced-apart connector units disposed in electrically-conductive contact with one of said positive polarity and said negative polarity, respectively, and each of said connector units having a connector plate, a pair of clamp arms extending inwardly from said connector plate, a clamp carried by said pair of clamp arms, and a connecting cable detachably attached to said clamp of each of said pair of connector units, said clamp comprises a clamp base extending between said pair of clamp arms and a pair of crimp arms extending from said clamp base at an angle with respect to a plane of said connector plate, and wherein said connecting cable comprises a plurality of wire strands and wire insulation provided on said wire strands.

17. The battery system of claim 16 further comprising a plate opening extending through said connector plate and a pair of plate slots provided in said connector plate and communicating with said plate opening.

18. The battery system of claim 16 wherein said pair of crimp arms of said clamp of a first one of said connector units is disposed at a generally 90-degree angle with respect to said pair of crimp arms of said clamp of a second one of said connector units.

* * * * *